United States Patent [19]

Kano et al.

[11] Patent Number: 4,839,708

[45] Date of Patent: Jun. 13, 1989

[54] ELECTROMECHANICAL SEMICONDUCTOR TRANSDUCER

[75] Inventors: Hiroyuki Kano, Nishikamo; Yuji Yagi, Aichi; Hiroyuki Sakaki, Yokohama, all of Japan

[73] Assignee: Kabushiki Kaisha Toyota Chuo Kenkyusho, Aichi, Japan

[21] Appl. No.: 11,243

[22] Filed: Feb. 5, 1987

[30] Foreign Application Priority Data

Feb. 8, 1986 [JP] Japan .................................. 61-26452

[51] Int. Cl.[4] ...................... H01L 29/84; H01L 29/96
[52] U.S. Cl. ........................................ 357/26; 357/16;
357/4; 73/727; 338/2
[58] Field of Search .................. 357/26, 40, 16; 338/2;
73/727, 777

[56] References Cited

U.S. PATENT DOCUMENTS

| | | | |
|---|---|---|---|
| 3,609,252 | 9/1971 | McKinney et al. | 357/231 X |
| 3,916,365 | 10/1975 | Giachino | 73/727 X |
| 4,171,996 | 10/1979 | Maslov et al. | 357/16 |
| 4,194,935 | 3/1980 | Dingle et al. | 357/16 X |
| 4,503,709 | 3/1985 | Rühle | 73/727 |
| 4,590,399 | 5/1986 | Roxlo et al. | 310/358 X |
| 4,665,415 | 5/1987 | Esaki et al. | 357/22 A |
| 4,706,100 | 11/1987 | Tufte | 357/16 |

FOREIGN PATENT DOCUMENTS 2714032  10/1978  Fed. Rep. of Germany ........ 357/26

OTHER PUBLICATIONS

Moore, R. M. et al., "The Heterode Strain Sensor ...", IEEE Trans Elec. Dev., Oct. 1969, pp. 850–855.

Drummon, T. J. et al., "Use of a Superlattice to Enhance the Interface Properties ...", App. Phys. Lett., Apr. 1, 1983, pp. 615–617.

Primary Examiner—Andrew J. James
Assistant Examiner—Sara W. Crane
Attorney, Agent, or Firm—Parkhurst, Oliff & Berridge

[57] ABSTRACT

There is disclosed an electromechanical semiconductor transducer which is composed of a substrate of a first compound semiconductor and layers of second to fifth compound semiconductors grown on the substrate. The compound semiconductor contains at least one element such as aluminum, gallium, and arsenic selected from Groups III and V of the periodic table. The transducer converts mechanical strain into electrical signals.

9 Claims, 6 Drawing Sheets

ELECTROMECHANICAL SEMICONDUCTOR TRANSDUCER

BACKGROUND OF THE INVENTION

1. Field of the Invention

The present invention relates to an electromechanical semiconductor transducer which converts mechanical strain into electrical signals.

2. Description of the Prior Art

Figure 12:
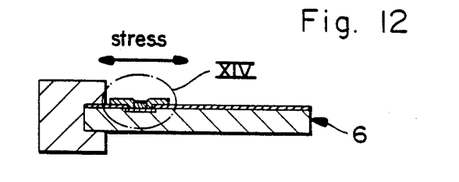
FIG. 12 is a sectional view of a cantilever-type electromechanical semiconductor transducer provided with a conventional gauge.
Figure 13:
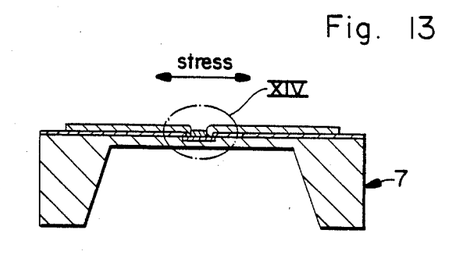
FIG. 13 is a sectional view of a diaphragm-type electromechanical semiconductor transducer provided with a conventional gauge.
Figure 14:
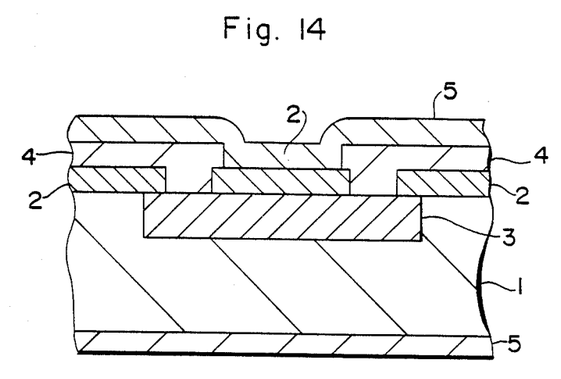
FIG. 14 is a sectional view of a conventional electromechanical semiconductor transducer.

The fact that a semiconducting material undergoes a change in electrical resistance when subjected to mechanical strain or stress is known as the piezoresistance effect. A silicon-based transducer which converts mechanical strain into electrical signals using this effect is being developed. The fundamental structure of such a transducer is shown in FIGS. 12 to 14. The transducer (6) shown in FIG. 12 is of a cantilever type and the transducer (7) shown in FIG. 13 is of a diaphragm type. The important strain gauge region is enclosed by line XIV, an enlarged view of which is shown in FIG. 14. The silicon-based electromechanical semiconductor transducer shown in FIG. 14 will be described in more detail below.

Usually the gauge region is constructed in the following manner. First, an n-type silicon substrate 1 is coated with an oxide film 2 (such as $SiO_2$) and a p-type diffusion layer 3 is formed by the thermal diffusion of boron or the like. Subsequently, metal electrodes (ohmic electrodes) 4 are formed by the vacuum evaporation of aluminum or the like. Finally, the silicon substrate 1 and the metal electrodes 4 are entirely covered with a passivation film 5 of $SiO_2$ or $SiN_x$.

When a mechanical strain or stress is applied to the p-type semiconductor transducer mentioned above in the direction of arrow shown in FIGS. 12 and 13, the electrical resistance of the p-type layer changes. This change is linearly proportional to the mechanical strain or stress applied. Therefore, it is possible to obtain the mechanical strain or stress applied to this part by measuring a change in the electrical resistance.

However, the conventional silicon-based electromechanical semiconductor transducer has many disadvantages, some of them are described below.

First, the gauge region (p-type) is electrically isolated from the substrate (n-type silicon) by means of the reverse bias effect of the p-n junction. Because of this structure, the gauge region does not work satisfactorily at high temperatures. In other words, because the leak current increases at the p-n junction at temperatures above 150° C., it is very difficult to electrically isolate the gauge region.

Second, in the case of silicon, it is difficult to form the hetero junction with crystal lattice matching for dissimilar semiconductors. It is only possible to utilize the piezoresistance effect of the conductive monolayer (p-layer). This limits the improvement of sensitivity and the optimization of element characteristics.

In addition, the energy forbidden band of silicon is narrower than that of compound semiconductors such as GaAs and $Al_x Ga_{(1-x)}$ As $(0 < X \leq 1)$. This causes the electrical conductivity to greatly fluctuate depending on temperatures. As a result, piezoresistance coefficient greatly fluctuates depending on temperatures.

Furthermore, the conductive substrate (n-type) needs a passivation film that entirely covers the external surface of the gauge. This poses a problem when the gauge is applied in the field of medical electronics.

Lastly, the formation of a p-type gauge region on the n-type silicon substrate requires many steps for $SiO_2$ film formation (as a diffusion mask), as well as impurity diffusion, annealing and passivation film formation.

SUMMARY OF THE INVENTION

In order to solve the problems involved in the conventional silicon-based electromechanical semiconductor transducer, the present inventors have devised an electromechanical semiconductor transducer based on a Group III–V compound semiconductor such as GaAs, $Al_x Ga_{(1-x)}$ As $(0 < X \leq 1)$. With the GaAs compound semiconductor, it is easy to obtain a high-resistance semi-insulating substrate $(>10^7 \Omega \cdot cm)$. Moreover, it is also possible to easily grow in multiple layers with lattice matching the thin film crystals of a dissimilar semiconducting material (such as GaAs and $Al_x Ga_{(1-x)}$ As $(0 < X \leq 1)$) on the high resistance GaAs substrate by the molecular beam epitaxy (MBE) or organometallic chemical vapor deposition (MOCVD). The combination of the substrate and epitaxial growth technology solves the above-mentioned problems involved in the conventional silicon-based transducer.

Accordingly, it is an object of the present invention to provide an electromechanical semiconductor transducer which comprises a semi-insulating high-resistance substrate of a first compound semiconductor; a conductive layer of a second compound semiconductor having the same lattice constance as the substrate formed on the substrate, or a conductive layer composed of more than one superlattice structure unit formed by placing layers of a third compound semiconductor and layers of a fourth compound semiconductor alternately one over another on the substrate; a cap layer of a fifth compound semiconductor formed on the conductive layer; and electrodes to connect the cap layer and conductive layer.

Figure 1:
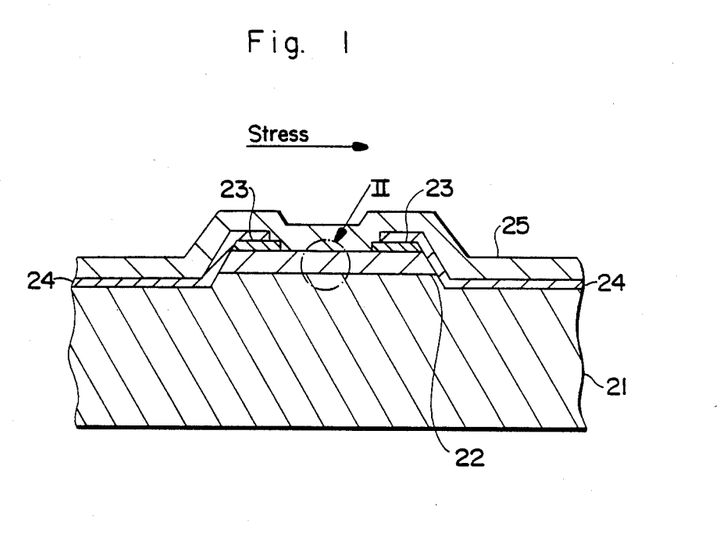
FIG. 1 is a sectional view showing the basic structure of the electromechanical semiconductor transducer of the present invention.
Figure 2A:
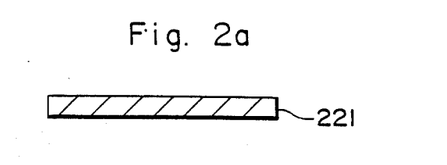
FIG. 2a is an enlarged sectional view showing the part II enclosed by a chain line in FIG. 1, the part II being of monolayer structure.
Figure 2B:
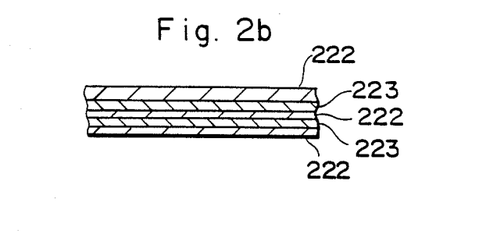
FIG. 2b is an enlarged sectional view showing the part II enclosed by a chain line in FIG. 1, the part II being of superlattice structure.

FIG. 1 shows the basic structure of the electromechanical semiconductor transducer of the invention, and FIGS. 2a and 2b are the enlarged views of the part enclosed by the line in FIG. 1. In this embodiment, the electrical resistance across the electrodes 24 changes when a mechanical strain or stress is applied in the direction of the arrow in the figure. Thus, one can know the magnitude of strain or stress by measuring the change in resistance.

The basic structure of the gauge is produced in the following manner. The conductive layer 22 is formed on the substrate 21 of semi-insulating high-resistance GaAs by crystal growth method such as MBE and MOCVD. The conductive layer 22 is a single layer 221 of p-type $Al_x Ga_{(1-x)}$ As $(0 \leq X \leq 1)$ as shown in FIG. 2a, or is composed of thin film crystals of dissimilar semiconductors as shown in FIG. 2b. The thin film is formed by placing layers 222 of p-type or undoped $Al_y Ga_{(1-y)}$ As $(0 < y \leq 1)$ and layers 223 of undoped or p-type $Al_z Ga_{(1-z)}$ As $(0 \leq z < 1, , z < y)$. It has more than one superlattice structure (layer thickness in the range of 10 to 100 Å). This conductive layer undergoes a change in electrical resistance in response to mechanical strain or stress. The conductive layer is covered with the cap layer 23 of p-type GaAs to provide a good ohmic contact with the metal electrode 24.

A desired gauge pattern is formed with a resist by the ordinary photolithographic technology on the top layer on the substrate 21. Using the resist as a mask, chemical etching is performed so that the cap layer 23 and conductive layer 22 are removed, resulting in a masked layer having a trapezoidal shape. (The chemical etching may be replaced by the proton implantation which increases resistance and electrically isolates the gauge region.) After etching, the ohmic metal electrodes 24 of AuZn alloy or the like are formed. The cap layer 23 is removed by etching except that part under the electrode. The gauge region thus formed is covered with the passivation film 25 (of $SiO_2$ or $SiN_x$), if necessary.

The above description is limited to GaAs and $Al_x Ga_{(1-x)}$ As ($0 < X \leq 1$), especialy the one of p-type crystal capable of lattice matching with the substrate crystal, amng the Group III–V compound semiconductors. The same description applies to n-type crystals as a matter of course. The gauge region can be produced from any combination of Group III–V compound semiconductors capable of lattice matching. Thus, the electromechanical semiconductor transducer made of such compound semiconductors is covered by the present invention. Just as with the GaAs substrate, a gauge region of high resistance is produced with an InP substrate. Thus, the gauge region of the invention can be produced from the combination of InP and GaInAsP.

DETAILED DESCRIPTION OF THE INVENTION

The invention is now described in more detail with reference to the following examples, which should not be construed to limit the scope of the invention.

Figure 3:
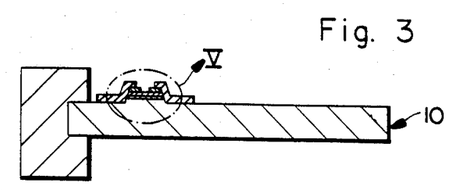
FIG. 3 is a sectional view of a cantilever-type electromechanical semiconductor transducer provided with the transducer element of the invention.
Figure 4:
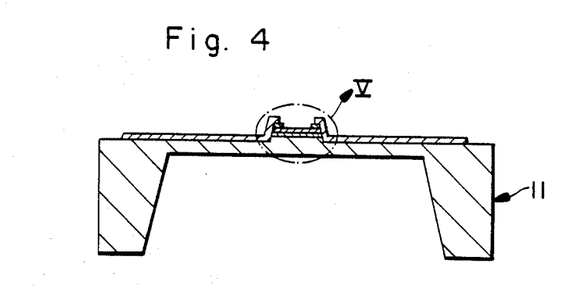
FIG. 4 is a sectional view of the diaphragm-type electromechanical semiconductor transducer provided with the transducer element of the present invention.

The gauge of the invention is used, for example, as shown in FIGS. 3 and 4. The cantilever-type electromechanical semiconductor transducer 10 is arranged as shown in FIG. 3, and the diaphragm-type electromechanical semiconductor transducer 11 is arranged as shown in FIG. 4. These apparatuses are intended to indirectly measure the mechanical strain or stress resulting from a load or pressure by measuring the electrical resistance of the gauge which varies in accordance with the mechanical strain or stress.

Figure 5:
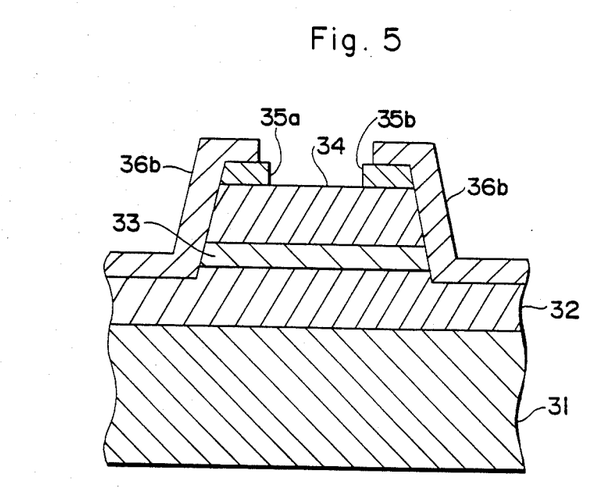
FIG. 5 is a sectional view of an embodiment of the gauge of the present invention.

The first embodiment of the gauge region of the present invention is shown in FIG. 5, which is an enlarged sectional view. This element is produced in the manner explained below. The crystal layers are formed consecutively on the semi-insulating high-resistance GaAs substrate [crystal plane (100)] 31 by the ordinary MBE method. At first, the buffer layer 32 (about 1 μm thick) of undoped GaAs is grown on the substrate. The layer is intended to prevent impurities from diffusing from the substrate to the gauge region when the gauge region is formed. The prevention of impurities is important for the quality of the crystals being grown. The layer thickness of 1 μm is exemplary only. Subsequently, the layer 33 (1000 Å thick) of undoped $Al_{0.3}Ga_{0.7}As$ is grown on the buffer layer. This layer is intended to prevent holes from escaping from the conductive layer 34 to the GaAs layer 32. Further, the conductive layer 34 (2000 Å thick) of p-type $Al_{0.3}Ga_{0.7}$ As ($P \approx 2 \times 10^{18} cm^{-3}$) is formed. Finally, the cap layer 35a and 35b (500 Å thick) of p-type GaAs ($P \approx 5 \times 10^{18} cm^{-3}$) u -3) is formed. This layer is intended to facilitate the formation of the ohmic electrode on the conductive layer 34.

The layers formed by crystal growth on the substrate 31 undergoes chemical etching by means of a resist in a desired pattern formed by ordinary photolithography. The etching is carried out until the conductive layer 34 and cap layer 35a and 35b are removed, leaving the masked trapezoidal shape. After etching, the surface is coated with metal electrode 36a and 36b of AuZn alloy by vacuum deposition. The desired wiring pattern is formed by the lift-off technique. For the improvement of ohmic performance, the product undergoes heat treatment at about 390° C. for about 1 minute. Finally, the cap layer 35 and 35b is removed by etching, leaving the part under the masked electrode.

The electrical resistance of the conductive layer 34 between 35a and 35b is measured via the voltage-current characteristics which appear when a voltage is applied across the metal electrodes 36a and 36b which function as the leads of the element.

Figure 6:
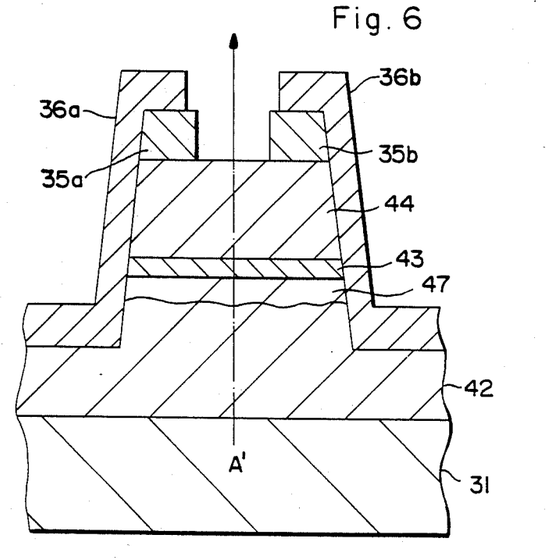
FIG. 6 is a sectional view of another embodiment of the gauge of the present invention.
Figure 7:
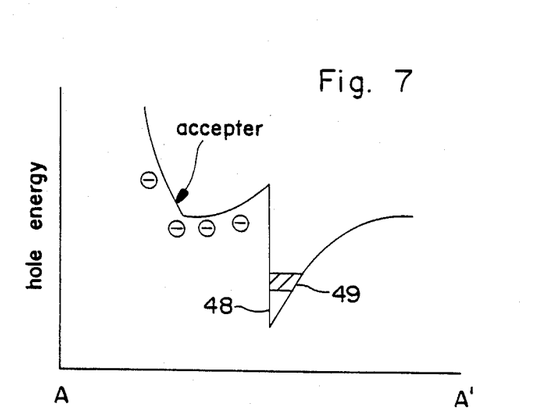
FIG. 7 is a diagram showing the hole energy level at the valence band edge along the line A–A' of the gauge shown in FIG. 6.

The second embodiment of the present invention is shown in FIG. 6. The difference between the first and second embodiments of the present invention is as follows: In the first embodiment, the conductive layer 34 is a monolayer of $Al_{0.3}Ga_{0.7}As$, whereas in the second embodiment the conductive layer is composed of the layer 42 of undoped GaAs formed on the substrate 31, the layer 43 (10 Å thick) of undoped $Al_{0.3}Ga_{0.7}As$ and the layer 44 (700 Å thick) of p-type $Al_{0.3}Ga_{0.7}$ As ($P \approx 2 \times 10^{18}$ cm$^{-3}$). In this layered structure, two-dimensional holes at the boundary layer 47 are responsible for electrical conduction. This is shown in FIG. 7 by the hole energy level curve at the valence band edge. The triangular potential well 48 occurs at the boundary between the layer 43 and the layer 42 because of the difference at the valence band edge between GaAs and Al$_{0.3}$Ga$_{0.7}$As. The holes in the layer 44 enter this well, forming the two-dimensional state. Therefore, the electrical resistance in the second embodiment is determined by the properties of the two-dimensional holes 49. In the case of two-dimensional holes, the energy level of heavy holes and the energy level of light holes, which are equal in the case of a bulk crystal, become different from each other. This is accompanied by an anisotropism of crystal orientation. Thus, the electric conduction due to the two-dimensional holes 49 has a higher piezoresistance coefficient.

Figure 8:
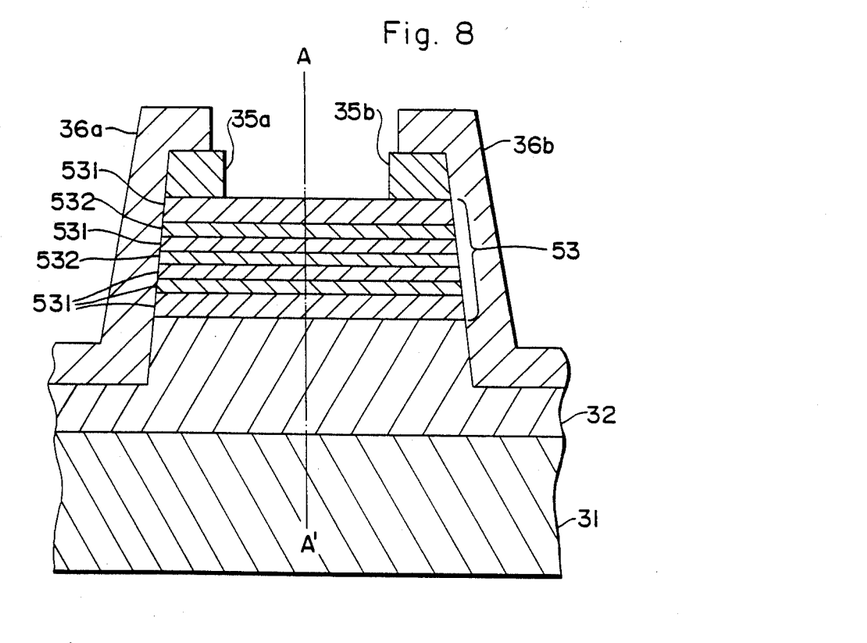
FIG. 8 is a sectional view of another embodiment of the gauge of the invention.

The third embodiment of the invention is shown in FIG. 8. It differs from the second embodiment in that it has a quantum well structure. In the case of the second embodiment, the electric conductance of the conductive layer is produced by the two-dimensional holes in the triangular potential well that occurs at the valence band edge. The structure of the second embodiment is limited because the width of the potential well is fixed at about 100 Å. In the third embodiment, the width of the potential well can be selected as desired.

Figure 9:
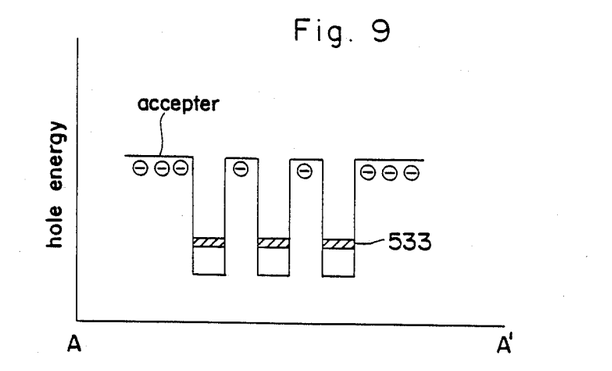
FIG. 9 is a diagram showing the hole energy level at the valence band edge along the line A–A' of the gauge shown in FIG. 8.

The third embodiment has the conductive layer 53 of multiple quantum well structure composed of layers 531 (80 Å thick) of p-type Al$_{0.3}$Ga$_{0.7}$As (P$\approx$2$\times$10$^{18}$ cm$^{-3}$) and layers 532 (80 Å thick) of undoped GaAs. In this case, the hole energy level curve for the valence band edge is as shown in FIG. 9. The layer 531 is the potential barrier layer and the layer 532 is the potential well layer and the holes are in the state of two-dimensional holes 533. The layers 531 and 532 and holes 533 are responsible for electric conductance. This structure permits one to design the width of the potential well as desired and hence to design a electromechanical semiconductor transducer having desired characteristics.

The electromechanical semiconductor transducers of the first and second embodiments were tested for piezoresistance coefficient. The results are shown in Table 1.

TABLE 1

| Measured values of piezoresistance coefficient | | | |
|---|---|---|---|
| Crystal orientation of the gauge (0$\bar{1}$1) | ( ) | (0$\bar{1}$1) | ( ) |
| Direction in which stress is applied | parallel | perpendicular | parallel | perpendicular |
| Embodiment No. 1 | +48 | −58 | +27 | −21 |
| Embodiment No. 2 | +212 | −120 | −80 | +133 |

Unit: 10$^{-4}$ mm$^2$/kg
( ): Shape formed by anisotropic etching

Figure 10:
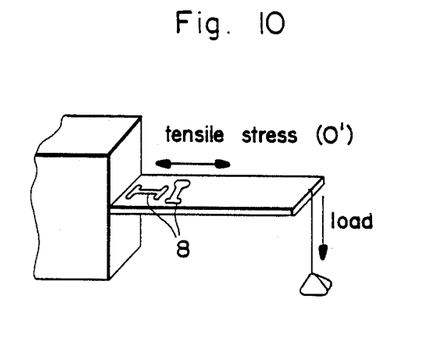
FIG. 10 is a schematic representation showing one method for evaluating the performance of the gauge of the invention.
Figure 11:
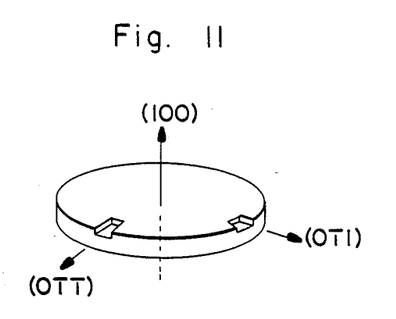
FIG. 11 is a schematic representation showing the crystal orientation of the gauge.

The measuring method employed is shown in FIG. 10, and the crystal orientation is shown in FIG. 11. A load is applied to the cantilever-type transducer in the direction of arrow and tensile stress is applied to the longitudinal direction of the gauge and the electrical resistance of the gauge region that changes according to the stress is measured. Four gauges 8 were used, each having the direction of crystal orientation of (011) and (0$\bar{1}$1) and arranged parallel and perpendicular to the direction of load. The results measured indicate the following:

(1) There is anisotropism depending on the direction of crystal orientation; and (2) The piezoresistance coefficient of the second embodiment is about four times that of the first embodiment. This suggests that it is possible to increase sensitivity by using two-dimensional holes and it is also possible to design a gauge of desired characteristic properties by using the superlattice structure.

As mentioned above, the electromechanical semiconductor transducer of the invention has the following features. It is composed of a semi-insulating high-resistance substrate, a conductive layer, a cap layer of Group III-V compound semiconductor such as GaAs and Al$_x$Ga$_{(1-x)}$As (0 < X ≦ 1), and electrodes connecting the cap layer, conductive layer, and substrate. In other words, a highly crystalline strain gauge region is formed on a high-resistance substrate. This means that the gauge region is electrically isolated from the substrate and outside object completely and gauges can be easily isolated from one another where a multiplicity of gauges are used. In addition, the gauge functions at temperatures above 150° C. without any adverse effect of leak current.

The gauge region is in the form of a thin film crystal layer having lattice matching with the semi-insulating high-resistance substrate. In the case where the layer is of the superlattice structure, it is possible to prepare a gauge having improved and desired sensitivity and temperature characteristics according to need.

The gauge layer of GaAs or Al$_x$Ga$_{(1-x)}$As (0 < X ≦ 1) having a broader energy forbidden band than silicon has a minimum of fluctuation in electric conductance by temperature and hence has a minimum of fluctuation in piezoresistance coefficient by temperature. Even the gauge of monolayer type has improved temperature characteristics and is stable to temperature change.

The use of the high-resistance substrate obviates the electrical passivation except the gauge region and electrodes, unlike the silicon substrate which needs the entire covering. This simplifies the gauge and permits the gauge to be used in the medical electronic field where the leak current from the gauge should be extremely small.

The gauge region of the invention can be produced with less processes than the silicon-based transducer having diffusion layers. The gauge region can be formed on the substrate in a single process of epitaxial growth. The gauge region of the invention will be applied to a variety of measuring instruments and electrical machines.

What is claimed is:

1. An electromechanical semiconductor transducer, comprising:

a semi-insulating high-resistance substrate of a first compound semi-conductor, said substrate deforming in response to a pressure or load applied thereto;

a conductive layer of a second compound semiconductor having a lattice constant equal to the lattice constant of said first substrate and formed on said substrate to thereby produce a piezoresistive effect;

an ohmic contact layer of a third compound semiconductor formed on said conductive layer; and electrodes connecting said ohmic contact layer and conductive layer.

2. A transducer as set forth in claim 1, wherein each of said compound semiconductor contains at least one element selected from the Groups III and V of the periodic table.

3. A transducer as set forth in claim 2, wherein said at least one element selected from Groups III and V is selected from the group consisting essentially of aluminum (Al), gallium (Ga), indium (In), phosphorus (P) and arsenic (As).

4. A transducer as set forth in claim 1, wherein the first compound semiconductor comprises GaAs; the second compound semiconductor comprises $Al_xGa_{(1-x)}As$ ($0 < X \leq 1$); and the third compound semiconductor comprises GaAs ($0 < y \leq 1$).

5. An electromechanical semiconductor transducer, comprising:
 a semi-insulating high-resistance substrate of a first compound semi-conductor, said substrate deforming in response to a pressure or load applied thereto;
 a conductive layer of a superlattice structure composed of at least one second compound semiconductor layer and at least one third compound semiconductor layer alternately placed upon said substrate to thereby produce a piezoresistive effect;
 an ohmic contact layer of a fourth compound semiconductor formed on said conductive layer; and
 electrodes connecting said ohmic contact layer and conductive layer.

6. A transducer as set forth in claim 5, wherein each of said compound semiconductors contains at least one element selected from Groups III and V of the periodic table.

7. A transducer as set forth in claim 6, wherein said at least one element selected from Groups III and V is selected from the group consisting essentially of aluminum (Al), gallium (Ga), indium (In), phosphorus (P) and arsenic (As).

8. A transducer as set forth in claim 6, wherein the first compound semiconductor comprises GaAs; the second compound semiconductor comprises $Al_yGa_{(1-y)}As$ ($0 < y \leq 1$); the third compound semiconductor comprises $Al_zGa_{(1-z)}as$ ($0 < z1, z < y$); and the fourth compound semiconductor comprises GaAs.

9. A transducer as set forth in claim 1, further comprising a high-resistance buffer layer formed between said substrate and said conductive layer for preventing a parasitic conduction through said substrate.

* * * * *

UNITED STATES PATENT AND TRADEMARK OFFICE
CERTIFICATE OF CORRECTION

PATENT NO. : 4,839,708
DATED : June 13, 1989
INVENTOR(S) : KANO et al.

It is certified that error appears in the above-identified patent and that said Letters Patent is hereby corrected as shown below:

In Claim 4, line 5, please delete "$(0 < y \leqq 1)$".

In Claim 8, line 5, please change "$Al_z Ga(1-z)as\ (0 < z1, z < y)$" to --$Al_z Ga(1-z)As (0 < z \leqq 1, z < y)$--.

Signed and Sealed this

Third Day of April, 1990

Attest:

HARRY F. MANBECK, JR.

Attesting Officer      Commissioner of Patents and Trademarks